Oct. 15, 1940.    E. B. NEWILL ET AL    2,217,807
REFRIGERATING APPARATUS
Original Filed April 22, 1936    6 Sheets—Sheet 3

INVENTORS
E. B. Newill, A. G. McCormack,
H. W. Wolcott, H. F. Smith
BY Spencer, Hardman & Frehr
ATTORNEYS

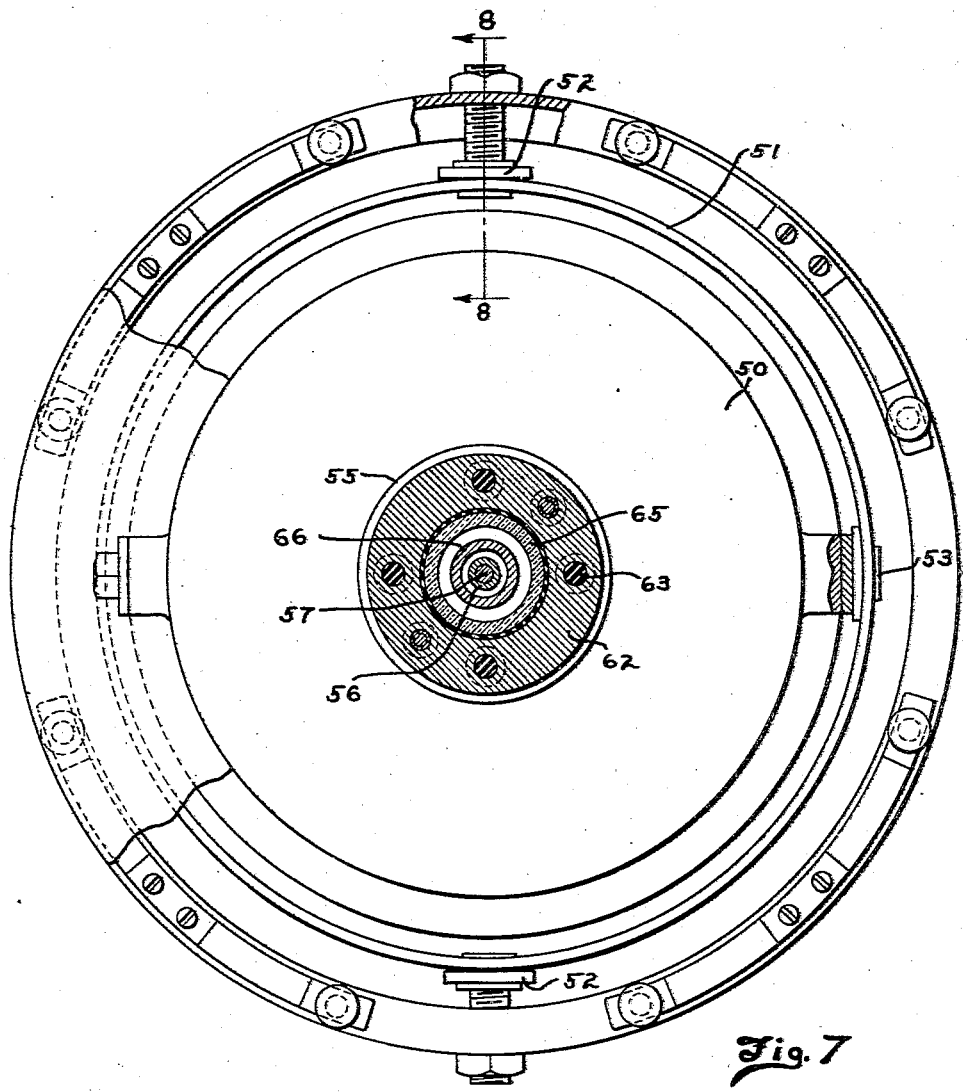
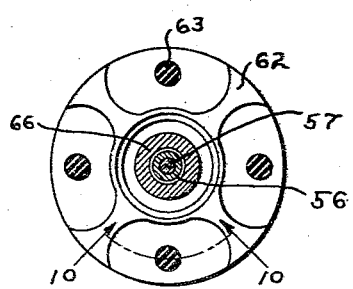
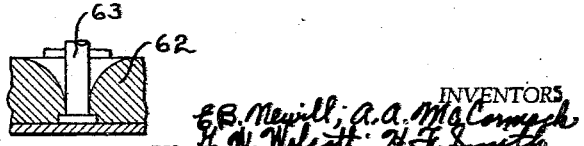

Patented Oct. 15, 1940

2,217,807

UNITED STATES PATENT OFFICE 2,217,807

REFRIGERATING APPARATUS

Edward B. Newill, Alex A. McCormack, Glenn W. Wolcott, and Harry F. Smith, Dayton, Ohio, assignors to General Motors Corporation, Dayton, Ohio, a corporation of Delaware Original application April 22, 1936, Serial No. 75,792. Divided and this application June 22, 1937, Serial No. 149,684

8 Claims. (Cl. 74—63)

This invention relates to refrigerating apparatus.

This application is a division of our copending application, Serial No. 75,792, filed April 22, 1936.

An object of this invention is to provide a drive for a fan or other member whereby the fan or other member is not directly connected to the motor which drives the usual compressor of a refrigerating system.

Further objects and advantages of the present invention will be apparent from the following description, reference being had to the accompanying drawings, wherein a preferred form of the present invention is clearly shown.

In the drawings:

Fig. 7 is a horizontal cross sectional view of Fig. 6;

Fig. 9 is a horizontal cross sectional view of a portion of the fan shown in Fig. 6;

Fig. 10 is a cross sectional view along the line 10—10 of Fig. 9;

Figure 1:
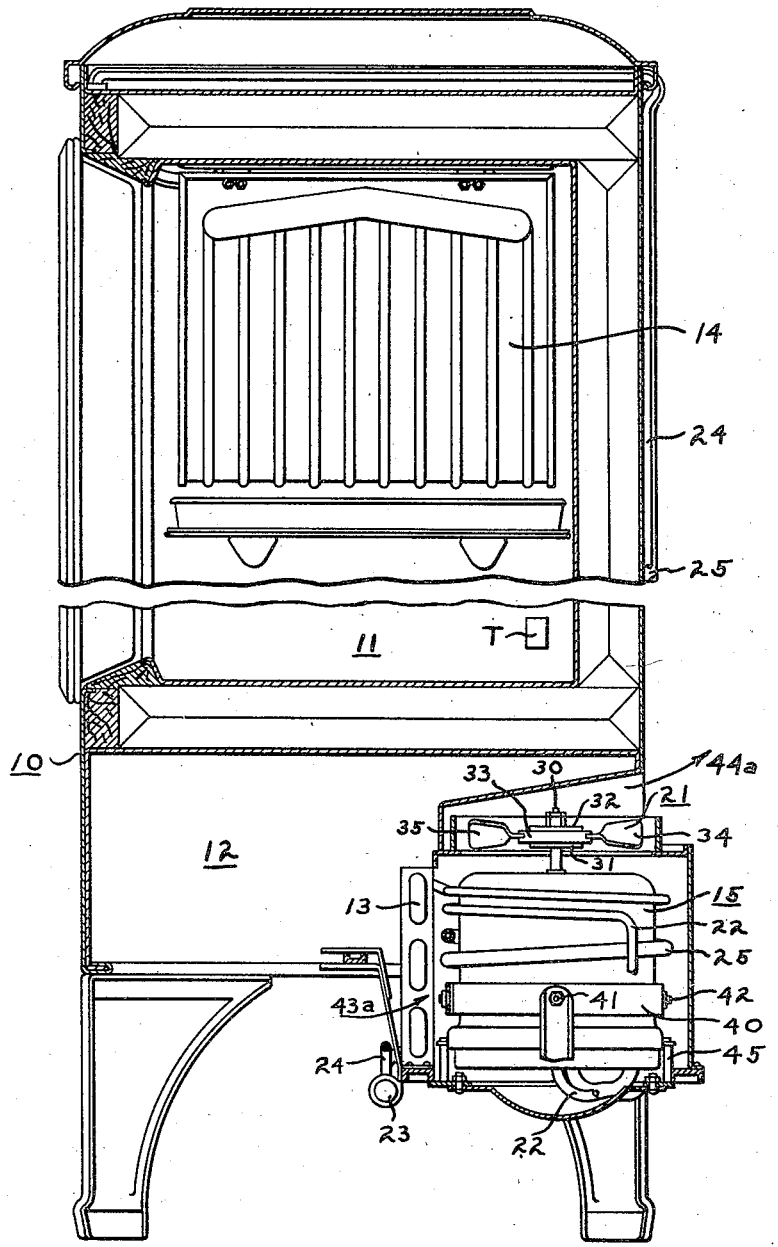
Fig. 1 is a diagrammatic representation of a refrigerating apparatus embodying features of this invention.
Figure 2:
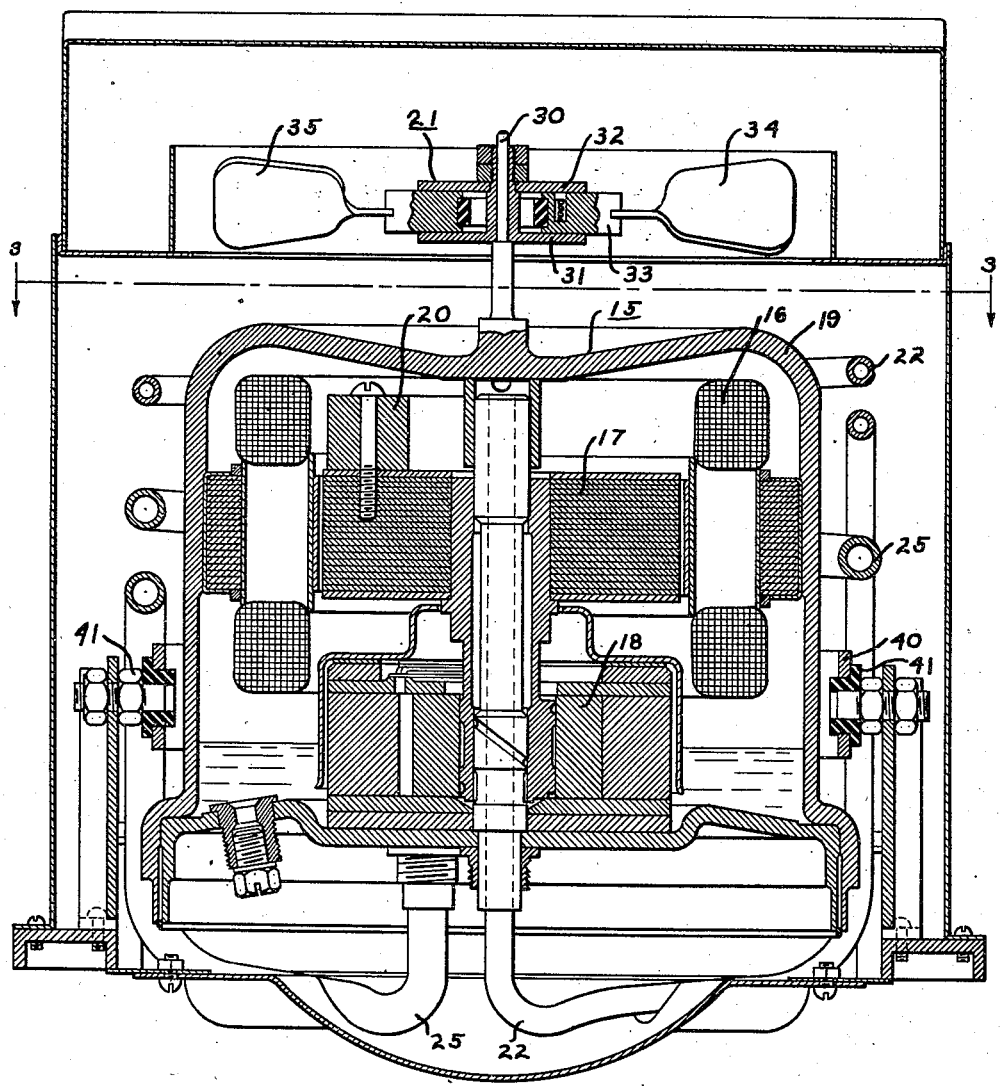
Fig. 2 is a vertical cross sectional view of a portion of the apparatus shown in Fig. 1.
Figure 3:
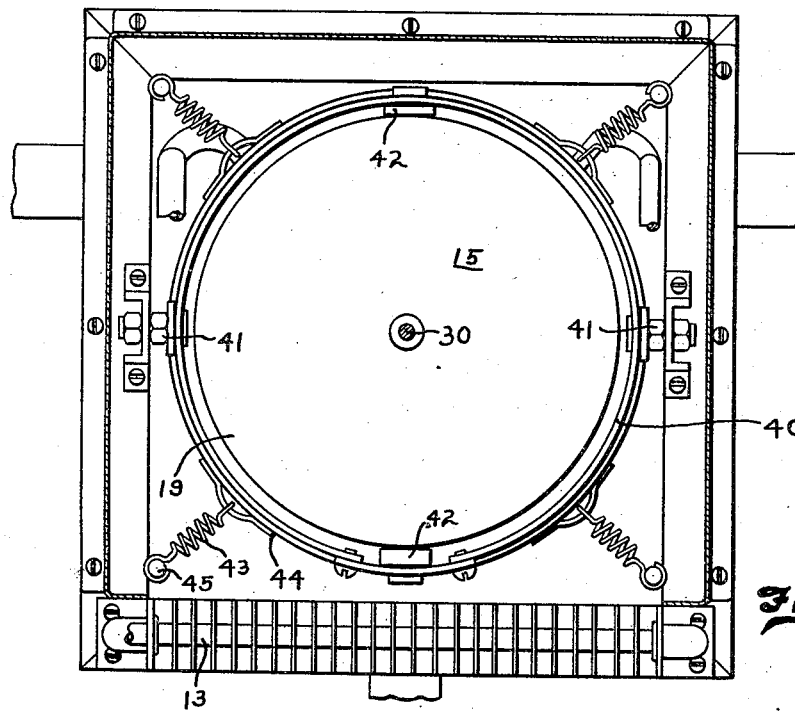
Fig. 3 is a horizontal cross sectional view taken along the line 3—3 of Fig. 2.
Figure 4:
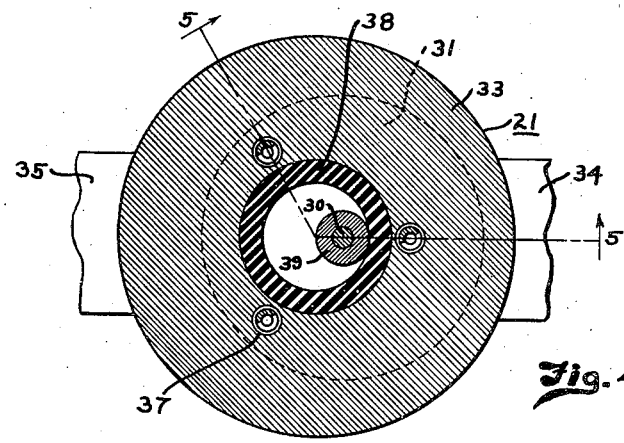
Fig. 4 is a horizontal cross sectional view of a portion of the fan shown in Fig. 2.
Figure 5:
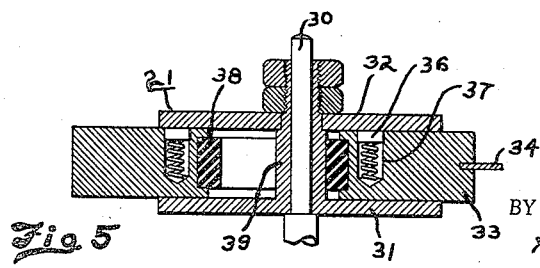
Fig. 5 is a cross section taken along the line 5—5 of Fig. 4.

In the use of modern motor-compressor units it is desirable to seal the unit completely against leakage of gas pressures in the system, and it becomes a problem to drive the condenser fan economically without directly connecting the fan to the motor inside of the unit.

Several ways have been used for driving the fan, of which two prominent methods are, first, a separate motor to rotate the fan, and second, a strong magnet on the enclosed shaft which is followed by another magnet just outside the unit casing. According to this invention it is not necessary to resort to either of these methods in order to provide a drive for the condenser fan.

This invention is particularly useful with respect to refrigerating apparatus, although it is to be understood that many of its advantages may be used with other apparatus. Accordingly, in order to illustrate the invention, the invention has been disclosed as applied to refrigerating apparatus without thereby intending to limit the scope of the invention.

A refrigerating system may be associated with or carried by a cabinet generally indicated by 10, which is provided with an insulated food storage compartment 11 and with a machinery compartment 12. The refrigerating system may include a condenser 13, an evaporator 14 and a sealed motor-compressor unit 15 associated in refrigerant flow circuit relationship. The motor-compressor unit may have within it a motor stator 16, a motor rotor 17, which together form a motor which drives the rotor 18 of the compressor. The motor and compressor are sealed within a casing 19 and the parts are so balanced with respect to each other, with or without the aid of an additional weight, such as 20, so that the casing 19 tends to rotate or gyrate. A compressor fan 21 is connected with the casing 19, preferably at its upper end, and the vibrations or gyrations of the casing are used to rotate the fan 21.

The fan 21 is used to create a current of air past the unit 15 and the condenser 13 in order to dissipate the heat of the system.

The refrigerant system may be of the usual type in which compressed refrigerant is delivered from the unit 15 through the pipe 22 to the condenser 13, from whence the liquefied refrigerant flows to the receiver 23 and flows through the line 24, through the usual extension device, into the evaporator 14. The expanded refrigerant returns through the pipe 25 to the motor-compressor unit 15. The heat which is absorbed by the evaporator 14, together with the heat which is generated within the unit 15, is dissipated into the air stream which is forced by the fan 21 past the condenser 13 and the unit 15.

The refrigerating system may be controlled by a thermostat T or the like and this thermostat opens and closes the electric circuit which is connected with the stator 16, thus automatically starting and stopping the unit. The construction of the fan 21 and its support, is such that it automatically falls into synchronism with, and is driven by, the gyrations of the unit 15 very soon after the unit has started.

In order to accomplish this, the support of the fan 21 on the unit 15 includes a lost motion connection or device which causes an acceleration in the rotation of the fan until the fan is in synchronism with the unit. In the modification shown in Figs. 1 to 5 inclusive, the lost motion connection also includes a friction device to insure the synchronization of the fan with the unit. The fan 21 is mounted on a bearing or shaft 30 on which the discs 31 and 32 are rotatably mounted. Within these discs a ring 33 is secured which carries the fan blades 34 and 35. The ring 33 has a plurality of friction pads 36 (which may be consolidated into an annular pad if desired) placed in holes 37, which are urged upwardly against the disc 32 to regulate the friction engagement between the ring 33 and the discs 31 and 32. In addition, a ring 38, of Bakelite or the like, is placed inside of the ring 33 so that the hub 39 of the disc 31 engages the same during operation.

When the motor is started by the thermostat, it rapidly reaches its running speed, which may be about 1750 R. P. M., and circular oscillation or gyration of the pin or bearing 30 takes place. Since the inertia of the fan 21 at starting makes it tend to stand still, there is sliding friction between the discs 31 and 32 and the fan hub or ring 33. The center of gravity of the fan tends to work away from the center of gyration of the pin 30, and immediately there is a torque produced, which, though it reverses twice during every oscillation or gyration, is predominantly in the direction of rotation desired. The fan accelerates until it reaches the speed of gyration of the bearing 30, when it pulls into step like a synchronous motor and rotates with a fixed phase relation or lag to the pin 30. As in the synchronous motor, the phase angle increases as the torque increases, up to the point of maximum torque.

In order to permit the unit 15 to gyrate at its upper end, it is preferably mounted on gimbals. As shown in Figs. 1 to 5 inclusive, the gimbals may include a ring 40 mounted on oppositely disposed bearings 41 on the frame of the cabinet. The gimbal ring 40 also is provided with oppositely disposed bearings 42, which support the casing 19. The bearings 41 and 42 are placed at right angles to each other. The casing 19 is tied down by springs 43 which are secured to brackets 44 placed on the lower portion of the casing 19. These springs are secured at the other end to pins 45 on the cabinet frame and this permits a free, but limited gyration of the upper end of the casing 19, sufficient to permit the casing to rotate the fan.

The air circulated by the fan 21 enters at 43a, passes the condenser 13 and unit 15 and leaves at 44a. The pipes leading to and from the unit 15 may be coiled around the unit, as shown, to impart resiliency to the pipes and to permit the unit to gyrate freely.

In the modification shown in Figs. 6 to 10 inclusive, the unit 50 may be mounted on a cabinet and may be connected to a refrigerating system substantially the same as indicated in Fig. 1. The unit is mounted on a gimbal ring 51 having rubber-like bearings 52 on the cabinet or its frame and bearings 53 on the casing 50 of the unit. The top of the unit is provided with a downwardly bent pocket 54 which with the inverted cup 55 forms a lubricant reservoir outside of the casing 50. The cup 55 is provided with a bearing sleeve 56 into which the pin 57 may be placed. This pin may rest on the thrust ball bearing 58 within the lubricant reservoir and is provided with a spiral groove 59 which tends to pump lubricant up along the bearing thus formed. The pin 57 carries a fan disc 60 provided with fan blades 61. A centrifugal weight 62 which forms a lost motion device or connection, is hung from the disc 60 by means of rubber hangers 63 which are imbedded in the metal of the weight 62. The weight 62 preferably is in the form of a ring having a Bakelite friction ring 65. In addition, an oil catching sleeve 66 extends downwardly from the disc 60 and returns oil to the reservoir which finds its way upwardly along the pin 57. The reservoir formed by the cup 55 is filled with oil only to such an extent that it cannot spill out through the openings 67, but the amount of oil provided may be sufficient to lubricate the bearing for many years if desired.

In this modification, as the unit starts, it quickly assumes its normal speed and its upper portion begins to gyrate. The centrifugal weight 62 tends to fly out, and the contact between the friction ring 65 and the oil catching sleeve 66 imparts a torque to the fan which eventually causes it to fall into synchronism with the gyrations of the unit.

Figure 6:
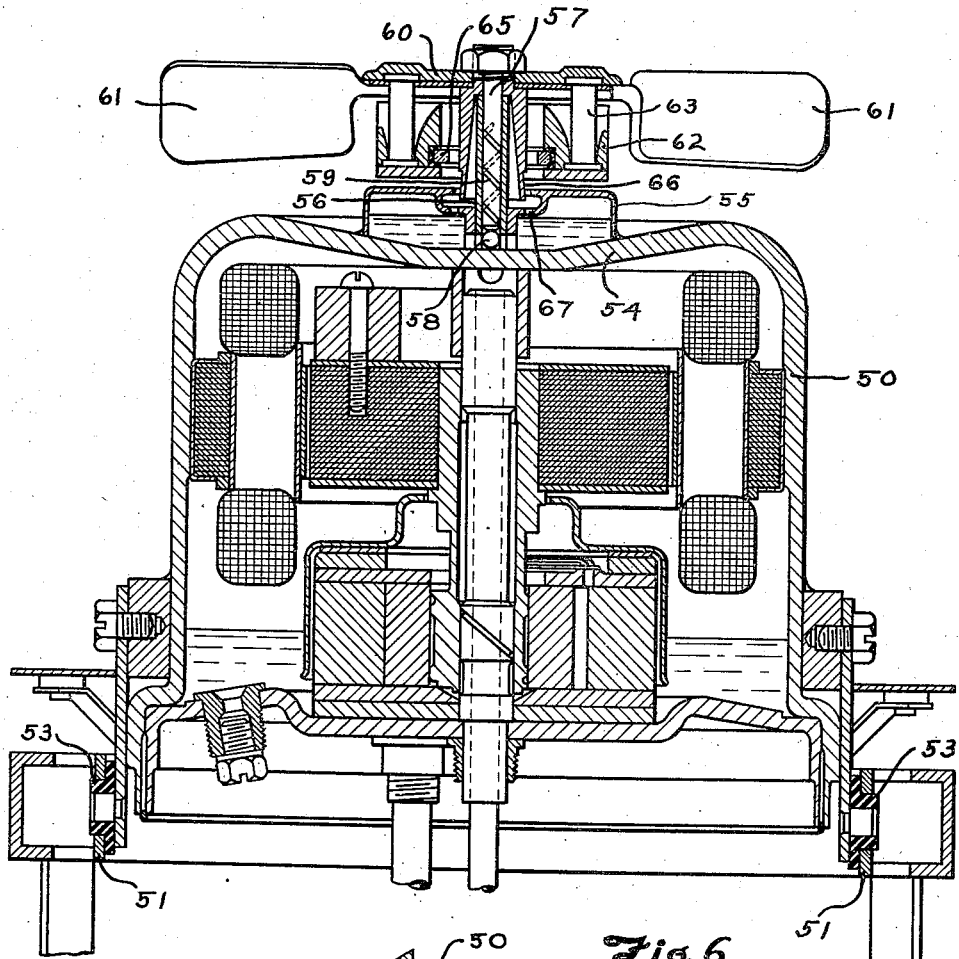
Fig. 6 is a view, somewhat similar to Fig. 2 but showing a modified form of a fan support.
Figure 8:
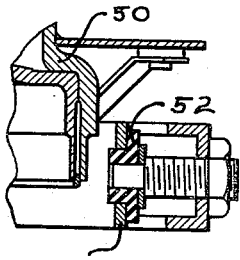
Fig. 8 is a cross section on the line 8—8 of Fig. 7, showing a portion of the gimbal support for the unit.
Figure 11:
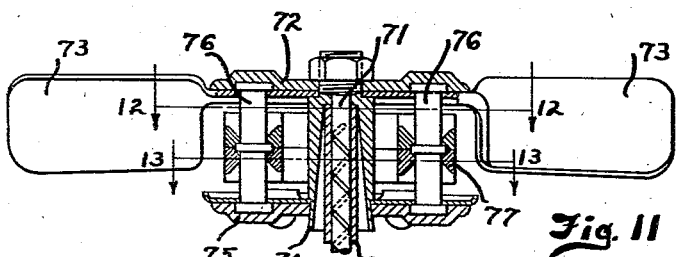
Fig. 11 is a cross sectional view of a further modified form of the fan support which may be substituted for that shown in Fig. 6.
Figures 12, 14:
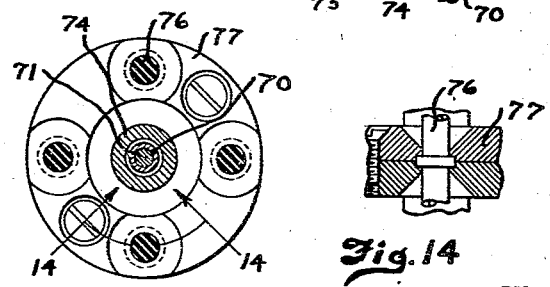
Fig. 12 is a cross section taken along the line 12—12 of Fig. 11.
Fig. 14 is a cross section taken along the line 14—14 of Fig. 12.

In the modification shown in Fig. 11, a unit similar to that shown in Fig. 6, may be provided with a slightly modified form of fan. The unit may be provided with a lubricated sleeve 70 similar to the sleeve 56. A pin 71 is placed in this sleeve and carries the fan hub 72 which is provided with fan blades 73. The oil return sleeve 74 is also provided and carries a ring 75. Between the ring 75 and hub 72, rubber pillars 76 are provided and these carry at their longitudinal center a centrifugal weight 77. As the motor unit starts and reaches speed, the bearing 70 gyrates and throws the weight 77 outwardly into contact with the oil sleeve 74. The frictional engagement thus produced imparts a rotating movement to the fan which eventually causes it to fall into synchronism with the gyrations of the motor unit.

Figure 16:
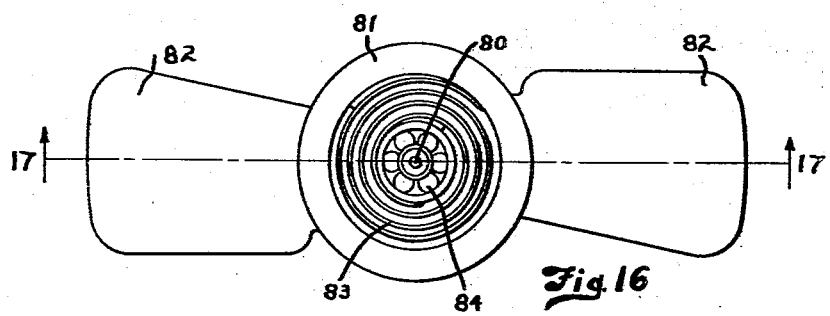
Fig. 16 is a plan view of a further modification of fan support.
Figure 17:
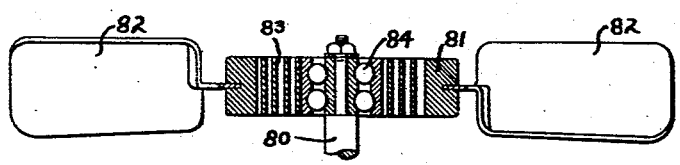
Fig. 17 is a cross section taken along the line 17—17 of Fig. 16.
Figure 13:
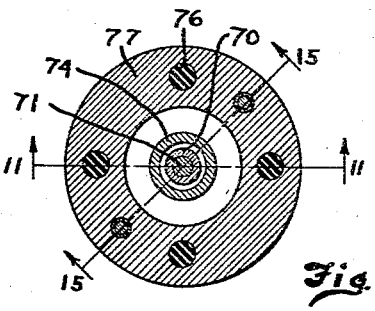
Fig. 13 is a cross section taken along the line 13—13 of Fig. 11.
Figure 15:
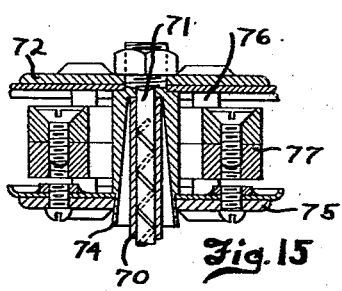
Fig. 15 is a cross section taken along the line 15—15 of Fig. 13.

In the modification shown in Figs. 16 and 17, a motor unit similar to that shown in Fig. 1 is provided with a pin 80. The fan ring 81 is provided with blades 82 and with a lost motion connection in the form of a spiral spring 83 with the bearing 84 at the end of the pin 80. The frequency of the spiral spring 83 is selected to be below that of the speed of gyration and, under such conditions, the fan is eventually synchronized with the unit by the frictions produced.

While the form of embodiment of the invention as herein disclosed, constitutes a preferred form, it is to be understood that other forms might be adopted, all coming within the scope of the claims which follow.

What is claimed is as follows:

1. A frame, a driving member supported on said frame and imparting gyrations to said frame, and a driven device supported for rotation on said frame and deriving its rotation from said gyrations, said driven device including at least two relatively movable parts, one of which brings the other part into synchronism with said gyrations.

2. Means for transmitting power from a driving member located on one side of an imperforate wall to a driven member located on the other side of the wall comprising means for imparting movement from said driving member to said wall, means for rotatably supporting said driven member on said wall, said driven member including at least two relatively movable parts, means whereby movement of said wall imparts relative movement to said members, and means whereby relative movement of said members imparts rotation to said driven member.

3. In combination, a pivot, means causing said pivot to gyrate, a device rotatably supported on said pivot, said device comprising at least two relatively movable parts in frictional engagement with one another, and means whereby relative movement of said parts imparts rotary movement to said device.

4. In combination, a housing, a motor carried within said housing, means for resiliently mounting said housing, a driven device supported for rotation on the outside of said housing, bearing means for said driven device, a lubricant reservoir for supplying lubricant to said bearing means, said driven device comprising a rotatable shaft having one end thereof disposed below the level of said lubricant and having an oil feed groove for feeding lubricant to the bearing surfaces, means for returning excess lubricant to said reservoir, means for automatically starting said driven device upon operation of said motor and comprising an element relatively movable with respect to said device and surrounding the central axis of said shaft, and means whereby the central axis of said element is capable of shifting relative to the central axis of said device.

5. A frame member, a resilient mounting for said frame member, a prime mover supported directly on said frame and imparting gyratory movement to said frame member, a driven device supported for rotation on said frame member and driven by energy from said movement, and a weight member carried by said device and supported in frictional engagement therewith, said driven device and said weight member being so constructed and arranged whereby gyratory movement of said frame member causes relative movement between said driven device and said weight member so as to render said driven device self-starting.

6. In combination, a hermetically sealed motor casing, a motor supported within said casing, a resilient mounting for said casing whereby operation of said motor causes said casing to gyrate, a pivot carried externally of said casing, means supported on said pivot and rotated by said gyrations, said device comprising at least two relatively movable parts in frictional engagement with one another, and means whereby relative movement of said parts renders said device self-starting upon starting of said motor.

7. In combination, a casing, a motor operatively disposed within said casing, means for resiliently mounting said casing whereby operation of said motor imparts a gyratory movement to said casing, a bearing carried by said casing, a fan mounted on said bearing, and a lost motion connection between said bearing and said fan, said lost motion connection including a frictional device so constructed and arranged as to cause acceleration of said fan when said motor is first put into operation.

8. In combination, a casing, a motor within said casing, means for starting and stopping said motor, means for resiliently mounting said casing whereby operation of said motor imparts a gyratory movement to said casing, a rotatable unbalanced fan pivotally mounted on said casing, and means accelerating said fan into synchronism with the gyrations of said casing upon starting of said motor.

EDWARD B. NEWILL.
ALEX A. McCORMACK.
GLENN W. WOLCOTT.
HARRY F. SMITH.